3,047,727
ELECTRICAL POWER SUPPLY SYSTEM
Raymond J. McAllise, Granby, Conn., assignor to The Kaman Aircraft Corporation, Bloomfield, Conn., a corporation of Connecticut
Filed Feb. 29, 1960, Ser. No. 11,736
5 Claims. (Cl. 307—2)

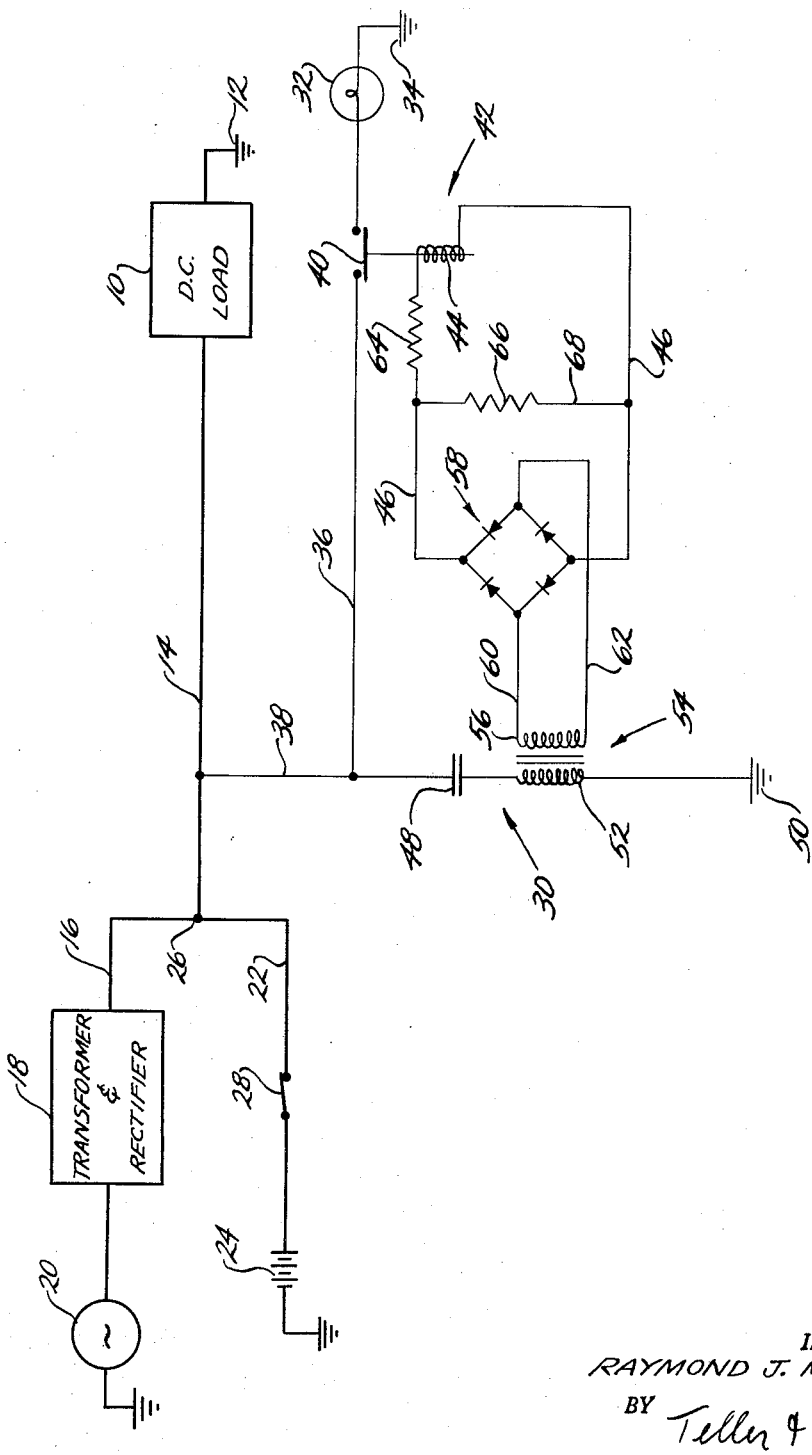

This invention relates to electrical power supply systems and, more particularly, to direct current power supply systems of the dual source type wherein power may be drawn from first and second sources alternatively and wherein a direct current supply voltage derived from the first power source includes a ripple or alternating current component while an alternatively usable direct current supply voltage derived from the second power source is substantially pure or devoid of any extraneous voltage components such as ripple.

It is the general object of the invention to provide a direct current power supply system of the above-mentioned dual source type which includes a means for indicating whether the first or second power source is supplying power to a load, the said indicating means being adapted for operation responsive to changes in a ripple or alternating current component of the direct current supply voltage whereby a positive indication of power source is provided with substantially no electrical power drain.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

The single FIGURE of the drawing is a schematic illustration showing a preferred embodiment of the electrical power supply system of the present invention.

While the invention is not so limited, the electrical power supply system shown in the drawing is particularly adapted for use in aircraft and, more specifically, in helicopters, the advantages of the system being particularly well illustrated in such an installation. As in aircraft in general, there are ordinarily several devices in a helicopter which are electrically operated and which require a direct current supply voltage. Since failure or malfunction of these devices and/or their electrical power supply is often critical, it is a conventional practice to utilize electrical operable devices which exhibit a high degree of durability and dependability in their operation and to provide an electrical power supply system of the above-referred to dual power source type. The two electrical power sources provide primary and secondary or normal and emergency direct current supply voltages for the electrically operable devices in the helicopter whereby to minimize the possibility of a critical failure or malfunction of such devices due to a power loss.

In power supply systems of the type under consideration, switch-over from normal to emergency power is ordinarily accomplished automatically and may occur without the knowledge of the helicopter pilot. This can be a serious disadvantage as where the emergency power source is exhaustible and conservation of electrical power by pilot action is required to prolong the period of safe emergency operation of the helicopter. Thus, it will be seen that a positive and dependable indication that automatic switch-over from normal to emergency power has occurred, such as is provided in the electrical power supply system of the present invention, is of the utmost importance in advising the helicoper operator of the need for conservation of electrical power.

Referring now more particularly to the drawing, it will be observed that one or more electrically operable devices of the type which may be found in a helicopter and which require a direct current supply voltage are represented by a "D.C. Load" identified by the reference numeral 10. The devices are or may be locally grounded as at 12 and are supplied with electrical power through a load conductor 14 connected therewith. Connected with the load conductor 14 is a primary or normal lead conductor 16 which extends from a transformer and rectifier unit 18 and from an alternating current power source 20. The power source 20 is the primary or normal source of electrical power for operating the devices represented by the load 10 and may comprise an A.C. generator or other conventional power generating device in the helicopter. The transformer and rectifier unit 18 is, or may be, conventional and comprises a transformer of a well-known type and a rectifying means for converting an alternating current voltage to a direct current voltage. Said rectifying means may take a variety of forms but it is to be noted that the nature of the rectifying means is such that the filter means included therein or associated therewith does not provide for a completely pure output voltage. That is, the rectified voltage derived from the alternating current power source 20 may be characterized as a direct current voltage having a significant ripple or alternating current voltage component.

There is also connected with the load conductor 14 a secondary or emergency lead conductor 22 which extends from a direct current power source comprising a locally grounded battery 24. The emergency lead conductor 22 joins the load conductor 14 at a junction 26 common to the aforementioned normal lead conductor 16 and is shown as having a switch 28 disposed therein. Provision of the switch 28 is optional but is preferred as will be explained hereinbelow. The said switch is shown in a closed position and is of the normally closed type, but is adapted to be opened manually directly or indirectly by the operator or other occupant of the helicopter.

From the foregoing it will be apparent that all of the aforementioned elements are connected in circuit each with the other so that electrical power may be supplied for the load 10 alternatively from the two power sources 20 and 24, the said two power sources obviously being connected in parallel with respect to each other. A primary or normal direct current supply voltage for the electrical devices of load 10 will be supplied from the alternating current power source 20 and the transformer and rectifier unit 18 when the said source and unit operate in the manner intended. Said direct current supply voltage may obviously also serve as a charging voltage for the battery 24. In the event of failure or malfunction in either the power source 20 or the transformer and rectifier unit 18 causing a substantial reduction in magnitude or a complete loss of the said supply voltage, the battery 24 will immediately and automatically provide a secondary or emergency direct current supply voltage for the electrical devices or load 10. This secondary or emergency supply voltage will provide for continued operation of the electrical devices or load 10 and continued safe operation of the helicopter, but it is to be noted that the period of such operation is limited to the capacity of the battery. Obviously, the period of emergency operation of the helicopter may be prolonged to substantial advantage by means of appropriate conservation of the available battery power. Such conservation can be provided for by the helicopter operator or other occupant by rendering certain non-essential electrical devices inoperative, but this obviously can only be accomplished when the operator or other occupant is first notified of the switch-over from normal to emergency electrical power.

The function of and the advantages of providing the aforementioned switch 28 can now be more fully appreciated. It will be apparent that isolation of the battery 24 from the electrical system will be desirable under certain conditions. When the helicopter is inoperative, especially when such condition obtains for prolonged periods of time, a substantial drain on battery power may be encountered even without operation of the electrical devices or load 10. Further, energized electrical conductors and other devices are a source of danger in the case of an impending crash likely to result in the spreading of gas or other highly volatile fuel about the aircraft. The switch 28 may be operated by the operator or other occupant of the helicopter to disconnect and isolate the battery 24 from the electrical system on landing the helicopter or in the event of an impending crash to positively avoid the undesirable results mentioned.

In accordance with the present invention and in order to provide a means of notifying the helicopter operator or other occupant of the switch-over from normal to emergency power, the electrical power supply system is provided with a means 30 for indicating whether electrical power is being drawn from the normal power source 20 or from the emergency power source 24. More specifically, the indicating means 30 operates in response to changes in the aforementioned ripple or alternating current voltage component of the primary or normal direct current supply voltage to indicate the presence and absence of said primary or normal supply voltage. Since the secondary or emergency direct current supply voltage provided by the battery 24 is of course pure or substantially devoid of extraneous voltage components such as ripple, a determination as to which of said direct current supply voltages is effective may be made by monitoring the ripple component of the normal supply voltage.

In the preferred embodiment of the invention shown, the indicating means 30 comprises a signal device in the form of a signal light 32. The said signal light may be located in the cockpit of the helicopter so as to be readily viewed by the operator or other occupant thereof and is adapted to be energized and de-energized to provide the necessary signals. More specifically and as shown, the signal light 32 is mantained in a de-energized condition during operation of the electrical system on normal power but is energized and illuminated when switch-over to emergency power occurs. A local ground 34 is provided for the signal light 32 and a conductor 36 connects said signal light with a conductor 38 which in turn is connected with the load conductor 14. Thus, electrical power for energizing the signal light 32 may be supplied from either the normal power source 20 or the emergency power source comprising the battery 24. In operation of the indicating means, the signal light 32 is supplied with power from the battery 24 as will be seen.

Disposed in the conductor 36 is a switch 40 which may be opened and closed respectively to de-energize and energize the signal light 32. The said switch forms a part of a relay indicated generally by the reference numeral 42 and which also includes a switch operating coil 44. The relay coil 44 is disposed in a conductor 46 and is adapted to be energized and de-energized respectively in response to the presence and absence of a direct current of given magnitude flowing in said conductor. It will be seen that the switch 40 is maintained in an open position as shown by the coil 44 when the latter is energized. The said switch is moved, as by suitable spring means not shown, to a closed position whereby to energize the signal light 32 when the relay coil 44 is de-energized.

Electrical power for energizing the relay coil 44 is supplied from the normal power source 20 and through the conductor 38 mentioned above. The said conductor leads from the load conductor 14 to a filter means comprising a condenser 48 and thence to ground at 50 through a primary coil 52 of a transformer indicated generally at 54. A secondary coil 56 of the transformer 54 is connected in circuit with a second rectifying means 58 by conductors 60 and 62. While other types of rectifying means may be utilized, a conventional bridge rectifier network is shown and the aforementioned conductor 46 containing the relay coil 44 is connected thereacross.

From the foregoing, it will be apparent that a signal voltage comprising only the amplified ripple component of the primary or normal direct current supply voltage may be provided for operating the relay coil 44. That is, the condenser 48, if properly selected, may be made to block the principal or direct current component of the said normal supply voltage and allow only the ripple or alternating current component thereof to be effective as a signal voltage. Such signal voltage will be amplified by the transformer 54 and converted to a direct current operating voltage for the relay coil 44 by the rectifying means 58. With the various electrical components thereof properly selected, a mode of operation of the indicating means may obviously be provided for wherein the relay coil 44 will be energized to hold the switch 40 open and maintain a de-energized condition of the signal light 32 whenever the amplified signal voltage equals or exceeds a predetermined magnitude. The said signal voltage will obviously vary in keeping with the ripple component of the primary or normal direct current supply voltage. Thus, switch-over to emergency power accompanied by loss of the ripple component will result in loss of the signal voltage and de-energization of the relay coil 44 and energization of the signal light 32 may be readily provided for as desired.

It will be observed that a resistor 64 is shown connected in the conductor 46 in series with the relay coil 44 and that a resistor 66 is shown connected in a conductor 68 and in parallel with the said coil. The provision of the resistors 64 and 66 is optional, but may be desirable in certain cases. Where matching of the components of the indicating means is difficult, as when high amplified signal voltages might burn the relay coil 44, it may be desirable to provide a series connected resistor such as the resistor 64 to permit necessary adjustment of the voltage across the said coil. Similarly, difficulty may be encountered in some instances in providing for efficient firing of the diodes of the rectifying means 58, the resistance offered by the relay coil being undesirably high. A parallel connected resistor such as the resistor 66 may be desirable to provide a comparatively low resistance alternative path for current flow whereby to assure firing of the rectifier diodes.

The advantages obtained with the electrical supply system of the present invention should be readily apparent from the foregoing and only a brief summary of such advantages is deemed necessary here. A positive indication of the presence or absence of the primary or normal direct current supply voltage and thus a positive indication of failure or malfunction of the primary or normal power source 20 or the transformer and rectifier unit 18 is obtained. As a result a helicopter operator is notified of switch-over to emergency power and may take appropriate steps for conservation of electrical power supplied by the exhaustible secondary or emergency power source to the end that safe emergency operation of the aircraft can be prolonged.

It will be noted that the indicating means shown and described will serve to advise the helicopter operator of switch-over to emergency power resulting from failure or malfunction occurring in either the power source 20 or the transformer and rectifier unit 18. In many aircraft electrical supply systems, a separate indicating means is provided for signaling a failure or malfunction of a primary power source such as the source 20. Obviously, the indicating means of the present invention may be used to advantage in such systems to provide a separate signal responsive to failure or malfunction of a transformer and rectifier unit such as the unit 18.

In addition to the above, it is also to be noted that the use of the ripple or alternating current component of the normal supply voltage as a signal voltage eliminates any significant drain on the normal power source. The ripple component of the normal supply voltage, utilized for operating the indicating means of the invention, ordinarily serves no useful purpose in contribution to the operation of the electrical devices supplied with power from the electrical supply system.

The invention claimed is:

1. In an electrical system, the combination of a load which requires a direct current supply voltage, an alternating current power source connected in circuit with the load, voltage rectifying means connected in circuit with said power source and with the load to provide a primary direct current supply voltage for the load, said primary direct current supply voltage having a significant ripple component, a direct current power source connected in circuit with the load and in parallel with said alternating current power source and said rectifying means to provide a secondary load supply voltage which is substantially devoid of extraneous voltage components, a signal device, means connected in circuit with said alternating current power source and said rectifying means and operable to provide a signal voltage which comprises only the aforesaid ripple component of said primary supply voltage, and electrical means connected with said last-mentioned means and said signal device and operable in response to changes in said signal voltage to operate said signal device whereby to indicate the presence and absence of said primary supply voltage.

2. In an electrical system the combination of a load which requires a direct current supply voltage, an alternating current power source connected in circuit with the load, voltage rectifying means connected in circuit with said power source and with the load to provide a primary direct current supply voltage for the load, said primary direct current supply voltage having a significant ripple component, a direct current power source connected in circuit with the load and in parallel with said alternating current power source and said rectifying means to provide a secondary load supply voltage which is substantially devoid of extraneous voltage components, a signal device, filter means connected in circuit with said alternating current power source and said rectifying means to provide a signal voltage which comprises only the aforesaid ripple component of said primary supply voltage, and electrical means connected with said filter means and said signal device and operable in response to changes in said signal voltage to operate said signal device whereby to indicate the presence and absence of said primary supply voltage.

3. In an electrical system, the combination of a load which requires a direct current supply voltage, an alternating current power source connected in circuit with the load, voltage rectifying means connected in circuit with said power source and with the load to provide a primary direct current supply voltage for the load, said primary direct current supply voltage having a significant ripple component, a direct current power source connected in circuit with the load and in parallel with said alternating current power source and said rectifying means to provide a secondary load supply voltage which is substantially devoid of extraneous voltage components, a signal device, filter means connected in circuit with said alternating current power source and said rectifying means to provide a signal voltage which comprises only the aforesaid ripple component of said primary supply voltage, voltage amplification means connected with said filter means, and electrical means connected with said voltage amplification means and said signal device and operable in response to changes in the signal voltage to operate said signal device whereby to indicate the presence and absence of said primary supply voltage.

4. In an electrical system, the combination of a load which requires a direct current supply voltage, an alternating current power source connected in circuit with the load, first voltage rectifying means connected in circuit with said power source and with the load to provide a primary direct current supply voltage for the load, said primary direct current supply voltage having a significant ripple component, a direct current power source connected in circuit with the load and in parallel with said alternating current power source and said first voltage rectifying means to provide a secondary load supply voltage which is substantially devoid of extraneous voltage components, an electrically operable signal device, switch means operatively connected with said signal device for controlling its operation, an electrical relay operatively associated with said switch means and adapted to be energized and de-energized to control the operation thereof, filter means connected in circuit with said alternating current power source and said first rectifying means so as to provide a signal voltage which comprises only the aforesaid ripple component of said primary supply voltage, voltage amplification means connected with said filter means, and second voltage rectifying means connected in circuit with said voltage amplification means and said electrical relay so as to provide an amplified direct current signal voltage across said relay and to energize and de-energize said relay in response to changes in said signal voltage whereby to operate said switch means and signal device to indicate the presence and absence of said primary supply voltage.

5. In an electrical system, the combination of a load which requires a direct current supply voltage, an alternating current power source connected in circuit with the load, first voltage rectifying means connected in circuit with said power source and with the load to provide a primary direct current supply voltage for the load, said primary direct current supply voltage having a significant ripple component, a battery conected in circuit with the load and in parallel with said alternating current power source and said first voltage rectifying means to provide a secondary direct current supply voltage for the load, a signal light, a switch connected in circuit with said battery and said signal light and adapted to be closed and opened respectively to energize and de-energize said light, a relay coil operatively associated with said switch and adapted to be energized and de-energized respectively to open and close said switch, a condenser connected in circuit with said alternating current power source and battery and said first rectifying means so as to provide a signal voltage which comprises only the aforesaid ripple component of said primary supply voltage, a transformer connected with said condenser to amplify said signal voltage, and second voltage rectifying means connected in circuit with said transformer and said relay coil so as to provide an amplified direct current signal voltage across said relay coil, said relay coil thus being energized and de-energized in response to changes in said signal voltage whereby to operate said switch and signal light to indicate the presence and absence of said primary supply voltage.

References Cited in the file of this patent

UNITED STATES PATENTS

| | | |
|---|---|---|
| 2,113,392 | Baruch | Apr. 5, 1938 |
| 2,139,330 | Gilson | Dec. 6, 1938 |